(12) United States Patent
Zhang et al.

(10) Patent No.: US 12,549,050 B2
(45) Date of Patent: Feb. 10, 2026

(54) FLUID DRIVE DEVICE

(71) Applicant: ZHEJIANG SANHUA AUTOMOTIVE COMPONENTS CO., LTD., Zhejiang (CN)

(72) Inventors: Jun Zhang, Zhejiang (CN); Jundi Hu, Zhejiang (CN); Bingjiu Yin, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 214 days.

(21) Appl. No.: 18/282,237

(22) PCT Filed: Mar. 14, 2022

(86) PCT No.: PCT/CN2022/080604
§ 371 (c)(1),
(2) Date: Sep. 15, 2023

(87) PCT Pub. No.: WO2022/194081
PCT Pub. Date: Sep. 22, 2022

(65) Prior Publication Data
US 2024/0055924 A1    Feb. 15, 2024

(30) Foreign Application Priority Data
Mar. 16, 2021    (CN) .......................... 202110280631.3

(51) Int. Cl.
*H02K 3/34*    (2006.01)
*H02K 1/16*    (2006.01)
(Continued)

(52) U.S. Cl.
CPC .............. *H02K 3/345* (2013.01); *H02K 1/16* (2013.01); *H02K 3/28* (2013.01); *H02K 11/40* (2016.01)

(58) Field of Classification Search
CPC ............ H02K 3/345; H02K 1/16; H02K 3/28; H02K 11/40; H02K 2203/09; H02K 5/225;
(Continued)

(56) References Cited

U.S. PATENT DOCUMENTS 3,340,494 A * 9/1967 Gutshall ................ H01R 11/12
411/149
5,978,208 A * 11/1999 Helms ...................... H01R 4/36
439/810
(Continued)

FOREIGN PATENT DOCUMENTS

CN    101540520 A    9/2009
CN    203352387 U    12/2013
(Continued)

OTHER PUBLICATIONS

International Search Report for PCT/CN2022/080604 mailed May 10, 2022, ISA/CN.
(Continued)

*Primary Examiner* — Ahmed Elnakib
(74) *Attorney, Agent, or Firm* — Yue (Robert) Xu; Apex Attorneys at Law, LLP

(57) ABSTRACT

A fluid drive device, comprising a stator assembly, a pin, and a conductive member. The pin is electrically connected to a winding of the stator assembly and the conductive member. The conductive member comprises a main body portion, an end portion, and a pin portion. The main body portion is connected to the end portion and the pin portion. The pin portion can serve as a pin end electrically connected to an external power supply. The conductive member further comprises a first portion. The first portion is connected to the end portion by means of a first connecting portion. The first portion is located in an extending direction of the thickness (Continued)

of the end portion. The conductive member is provided with a first hole and a second hole.

20 Claims, 12 Drawing Sheets

(51) Int. Cl.
*H02K 3/28* (2006.01)
*H02K 11/40* (2016.01)

(58) Field of Classification Search
CPC ........ H02K 7/14; H02K 3/50; H02K 11/0094; H01R 2201/10; H01R 13/02; H01R 13/40
USPC .................................................... 310/71, 179
See application file for complete search history.

(56) References Cited

U.S. PATENT DOCUMENTS

| | | | |
|---|---|---|---|
| 6,737,772 B2* | 5/2004 | Tanaka | H01R 11/12 |
| | | | 310/71 |
| 2004/0012296 A1 | 1/2004 | Sakai et al. | |
| 2009/0237905 A1 | 9/2009 | Motoda | |
| 2011/0023643 A1 | 2/2011 | Koga | |
| 2013/0264900 A1 | 10/2013 | Ichihara | |
| 2014/0091655 A1* | 4/2014 | Kajita | H02K 5/225 |
| | | | 310/71 |
| 2014/0242853 A1* | 8/2014 | Martin | H01R 4/26 |
| | | | 439/781 |
| 2020/0336037 A1 | 10/2020 | Naitou et al. | |
| 2024/0429768 A1* | 12/2024 | Hu | F04D 13/064 |

FOREIGN PATENT DOCUMENTS

| | | | |
|---|---|---|---|
| CN | 104362455 A | | 2/2015 |
| CN | 104518630 A | | 4/2015 |
| CN | 107732506 A | | 2/2018 |
| CN | 107887998 A | | 4/2018 |
| CN | 108448823 A | | 8/2018 |
| CN | 109586469 A | | 4/2019 |
| CN | 209448114 U | | 9/2019 |
| CN | 210240012 U | | 4/2020 |
| CN | 210397143 U | | 4/2020 |
| CN | 212182567 U | | 12/2020 |
| CN | 221126998 | * | 6/2024 |
| EP | 2279898 A1 | | 2/2011 |
| KR | 20190004234 A | | 1/2019 |

OTHER PUBLICATIONS

The 1st Office Action dated Jan. 6, 2023 for the Chinese Patent Application No. CN202110280631.3. English Translation of the 1st Office Action Provided by http://globaldossier.uspto.gov.
European search report issued on Mar. 7, 2025 for EP22770436.8.

* cited by examiner

FLUID DRIVE DEVICE

This disclosure is a national phase application of PCT international patent application PCT/CN2022/080604, filed on Mar. 14, 2022 which claims the priority to Chinese Patent Disclosure No. 202110280631.3, titled "FLUID DRIVE DEVICE", filed with the China National Intellectual Property Administration on Mar. 16, 2021, the entire disclosure of which are incorporated herein by reference.

FIELD

This disclosure relates to a fluid drive device.

BACKGROUND

A fluid drive device includes a stator assembly and a pin, one end of the pin is electrically connected to a winding of the stator assembly, and the other end of the pin is electrically connected to a conductive member used for electrical connection to an external power supply. The support strength between the other end of the pin and the conductive member used for electrical connection to the external power supply may affect the reliability of the electrical connection between the pin and the conductive member. Therefore, how to improve the support strength between the other end of the pin and the conductive member used for electrical connection to the external power supply so as to improve the reliability of the electrical connection between the pin and the conductive member is a technical problem that needs to be considered.

SUMMARY

An object of this disclosure is to provide a fluid drive device, which is beneficial to improve the support strength between the pin and the conductive member so as to improve the reliability of electrical connection between the pin and the conductive member.

In order to achieve the above object, the following technical solution is provided according to an embodiment of the present disclosure.

A fluid drive device, comprising a stator assembly, a pin, and a conductive member. The pin is electrically connected to a winding of the stator assembly and the conductive member. The conductive member comprises a main body portion, an end portion, and a pin portion. The main body portion is connected to the end portion and the pin portion. The pin portion can be configured as a pin end electrically connected to an external power supply. The conductive member further comprises a first portion and a first connecting portion. The first portion is connected to the end portion at least by a first connecting portion. The first portion is arranged in an extending direction of the thickness of the end portion. The conductive member is provided with a first hole and a second hole, where the first hole is arranged to penetrate the end portion along the thickness direction of the end portion, and the second hole extends along the thickness direction of the first portion. The first hole is in communication with the second hole, and for one of the pins, the pin extends into the first hole and the second hole, the corresponding part of the pin extending into the first hole is defined as a first mating portion, and the corresponding part of the pin extending into the second hole is defined as a second mating portion. The pin extending into the first hole, that is, the first mating portion is limitedly connected to the side wall corresponding to the first hole. The pin extending into the second hole that is the second mating portion is limitedly connected to the side wall corresponding to the second hole.

In the technical solution provided according to the disclosure, the conductive member further comprises a first portion, and the first portion is connected to the end portion by a first connecting portion. The first portion is arranged in an extending direction of the thickness of the end portion. The conductive member has a first hole and a second hole, where the first hole is arranged to penetrate the end portion along the thickness direction of the end portion, and the second hole extends along the thickness direction of the first portion. The first hole is in communication with the second hole, and the pin extends into the first hole and the second hole. The pin extending into the first hole is limitedly connected to the side wall corresponding to the first hole, that is, a first mating portion is limitedly connected to the side wall corresponding to the first hole. The pin extending into the second hole is limitedly connected to the side wall corresponding to the second hole, that is, a second mating portion is limitedly connected to the side wall corresponding to the second hole. In the manner described above, the pin can extend into the first hole and the second hole, thereby the mating height of the pin and the conductive member is improved, thereby facilitating of improving the support strength between the pin and the conductive member, and thus facilitating of improving the reliability of electrical connection between the pin and the conductive member.

DETAILED DESCRIPTION OF THE EMBODIMENTS

The present disclosure is further illustrated hereinafter in conjunction with drawings and specific embodiments.

The specific embodiments of the present disclosure are described in detail hereinafter in conjunction with the drawings. First of all, it should be noted that the location terms, such as upper, lower, left, right, front, rear, inside, outside, top and bottom, mentioned or possibly mentioned in this specification are relative concepts defined based on those configurations shown in the corresponding drawings, and therefore may vary with their locations or states of use. Therefore, these and other directional terms should not be construed as limiting terms.

A fluid drive device in the following embodiments can provide flow power for a working medium in a vehicle thermal management system, the working medium may be water or an aqueous solution, such as an aqueous solution including 50% ethylene glycol. Of course, the working medium may be other substance.

Figure 1:
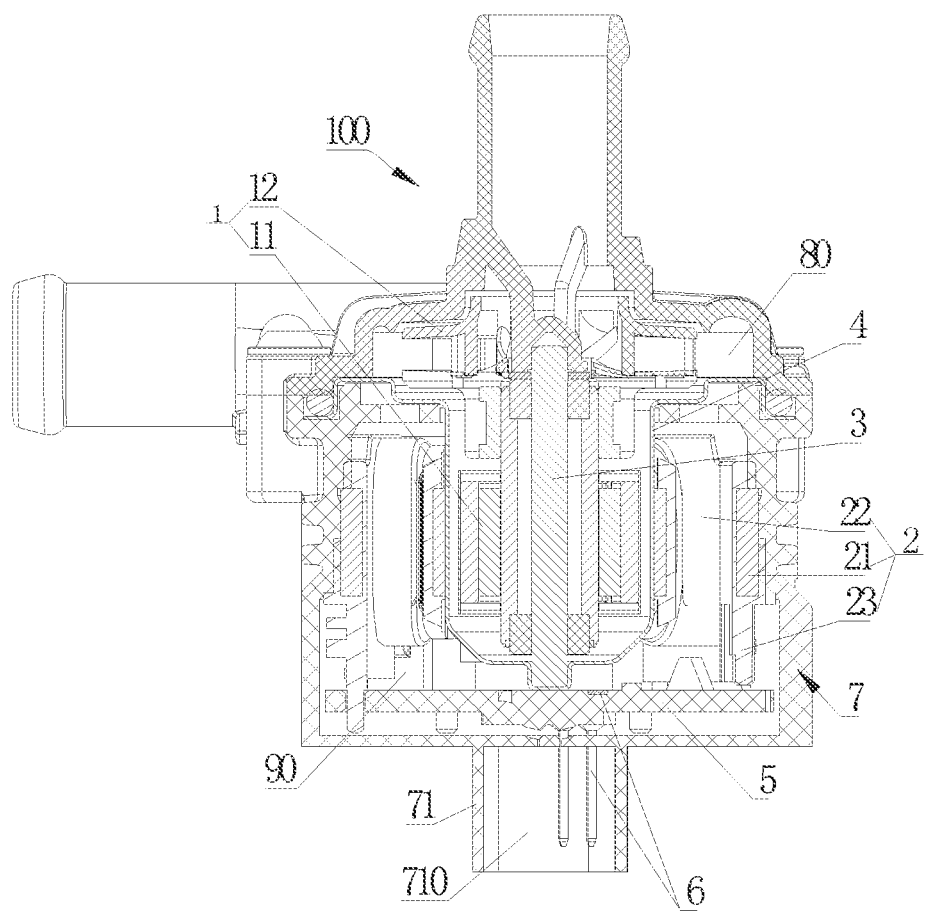
FIG. 1 is a sectional structural schematic view of a fluid drive device in the disclosure.

Referring to FIG. 1, a fluid drive device 100 includes a housing, a rotor assembly 1, a stator assembly 2, a shaft 3 and an partition portion 4, wherein the rotor assembly 1 is sleeved on the outer periphery of the shaft 3. The fluid drive device 100 further includes an inner chamber, and the partition portion 4 divides the inner chamber into a first chamber 80 and a second chamber 90. The first chamber 80 can have a working medium flowing through it, and the second chamber 90 is not in direct contact with the working medium. The rotor assembly 1 is arranged in the first chamber 80, and the stator assembly 2 is arranged in the second chamber 90. Referring to FIG. 1, the stator assembly 2 includes a stator core 21, an insulating frame 23 and a winding 22, wherein the insulating frame 23 covers at least part of the surface of the stator core 21, and the winding 22 is wound around the insulating frame 23. The rotor assembly 1 includes a permanent magnet 11 and an impeller assembly 12. When the fluid drive device 100 works, the excited magnetic field generated by the stator assembly 2 is controlled by controlling the current passing through the windings 22 of the stator assembly 2, and the rotor assembly 1 rotates around or together with the shaft 3 under the action of the exciting magnetic field.

Figure 2:
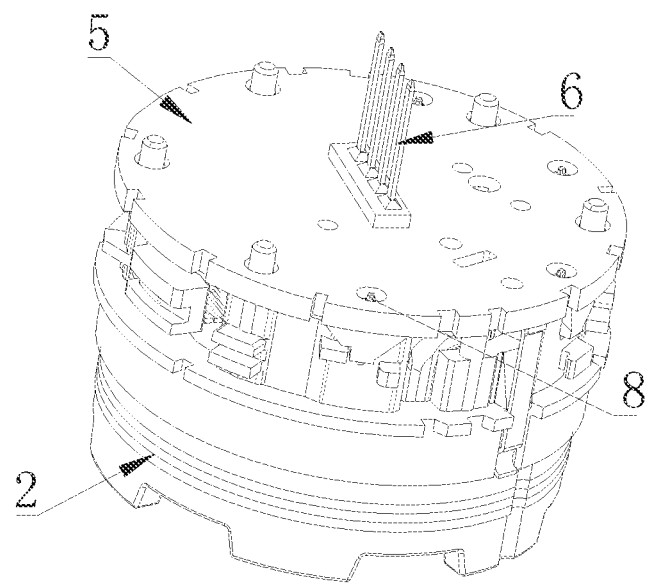
FIG. 2 is a perspective structural schematic view of a stator assembly, a pin, a limiting member and a conductive member assembled together in FIG. 1.
Figure 3:
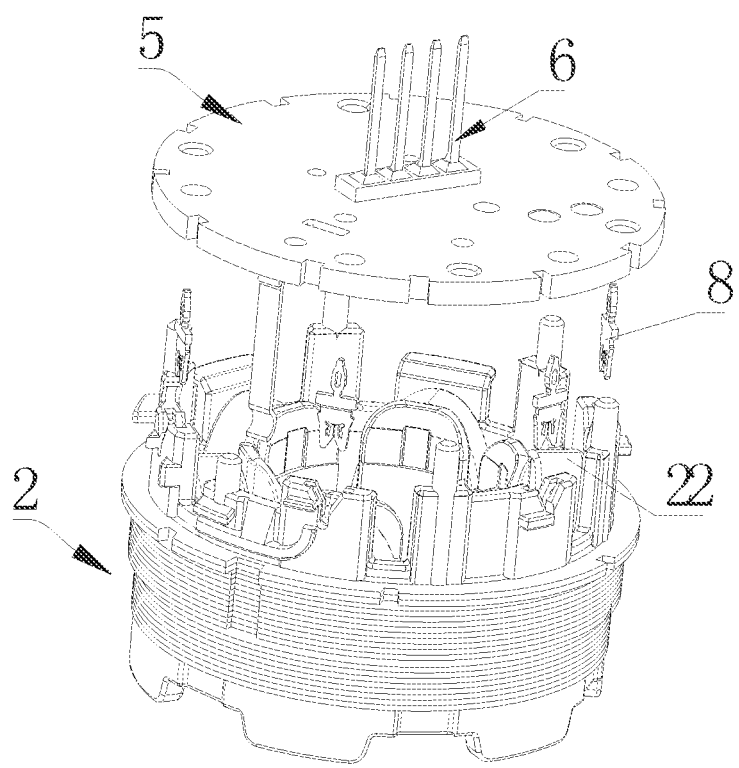
FIG. 3 is an explosive structural schematic view of the stator assembly, the pin, the limiting member and the conductive member in FIG. 1 or FIG. 2.

Referring to FIG. 1 to FIG. 3, the fluid drive device 100 further comprises a limiting member 5, a conductive member 6 and a pin 8. The pin 8 is electrically connected to the winding 22 of the stator assembly 2 and the conductive member 6, and the conductive member 6 and the limiting member 5 are arranged in a limited or fixed manner with each other. Specifically, in this embodiment, the conductive member 6 is partially embedded in the limiting member 5, and the limiting member 5 is an injection molded member, and the portion, in contact with the conductive member 6, of the limiting member 5 is not conductive. In this way, it is beneficial to prevent the current passing through the conductive member 6 from leaking from the limiting member 5 when the fluid drive device works; and it is more beneficial to realize the stable connection between the conductive member 6 and the limiting member 5. Of course, in other embodiments, the conductive member 6 can also be fixed in other manner. Referring to FIG. 1 to FIG. 3, in this embodiment, the stator assembly 2 and the limiting member 5 are arranged along the height direction of the fluid drive device. Specifically, the stator assembly 2 is closer to the impeller assembly 12 than the limiting member 5, that is, the stator assembly 2 is arranged between the limiting member 5 and the impeller assembly 12. Thus, when structurally configuring the fluid drive device 100, it is easier to achieve the miniaturization of the fluid drive device 100 with a simple structure. Of course, in other embodiments, the limiting member 5 can also be arranged between the stator assembly 2 and the impeller assembly 12, and the positions of the corresponding pin 8 and the conductive member 6 will be adaptively changed accordingly. Referring to FIG. 1, the housing includes a first housing 7, and the fluid drive device further includes a plug-in portion 71. In this embodiment, the plug-in portion 71 is integrated with the first housing 7, specifically, the plug-in portion 71 is provided protruding from a surface of the first housing 7. In this embodiment, an opening of the plug-in portion 71 is oriented along the axial direction of the fluid drive device 100. The plug-in portion 71, the limiting member 5 and the stator assembly 2 are arranged along the axial direction of the fluid drive device. The plug-in portion 71 has an accommodating chamber 710, and a part of the conductive member 6 is arranged in the accommodating chamber 710. By providing the plug-in portion 71, an external power supply interface can extend into the accommodating chamber 710 and be electrically connected to the conductive member 6.

Figure 4:
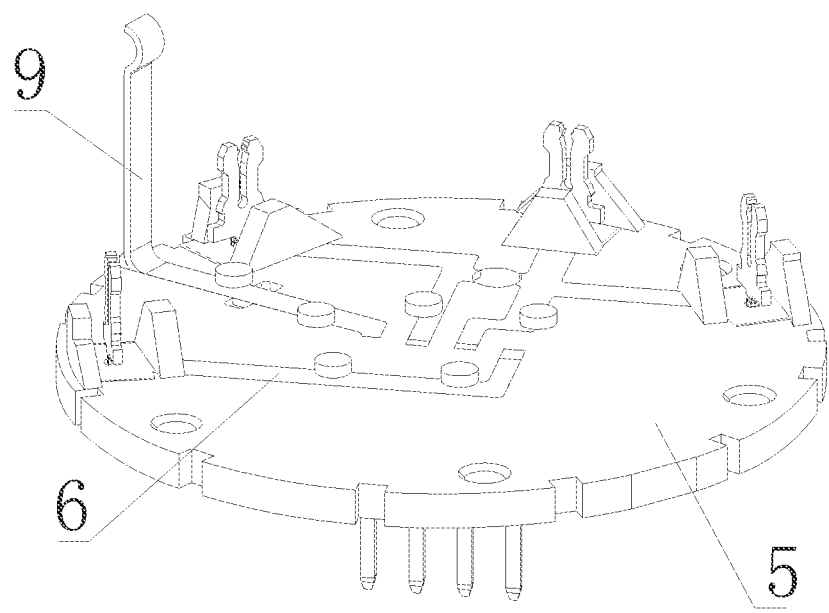
FIG. 4 is a perspective structural schematic view of the limiting member and the conductive member assembled together in FIG. 1.
Figure 5:
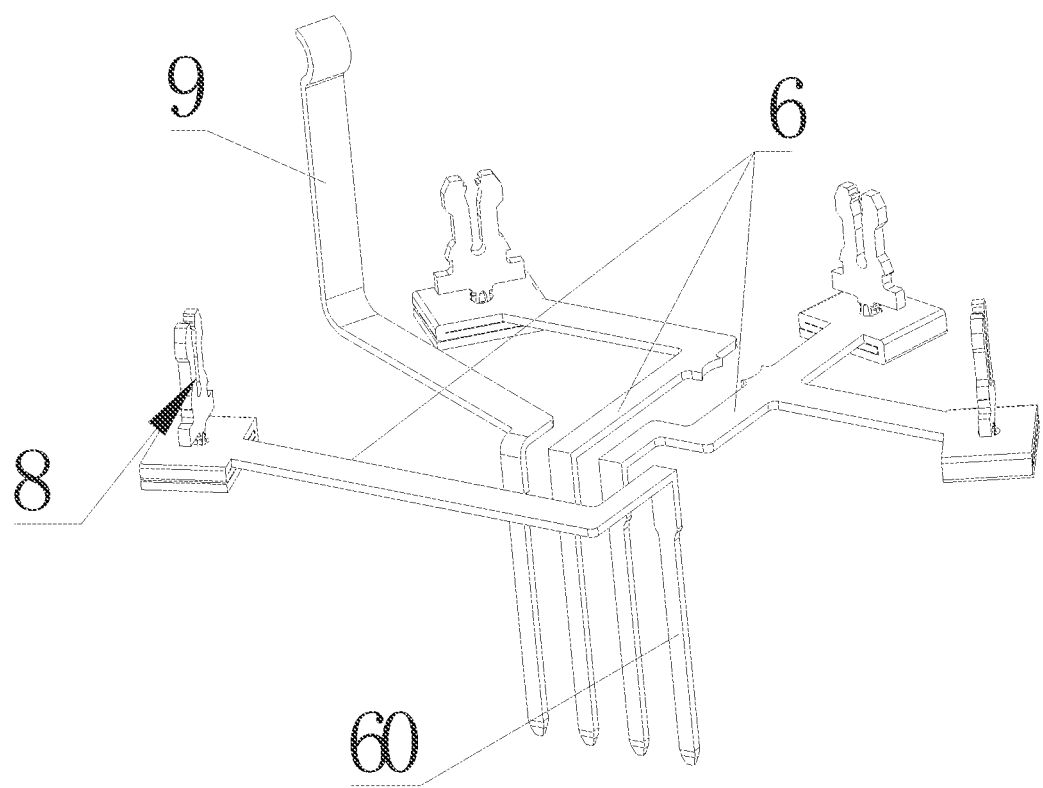
FIG. 5 is a structural schematic view of a first embodiment in which the conductive member, the ground member and the pin in FIG. 4 are combined together.

Referring to FIG. 3 to FIG. 5, in this embodiment, the fluid drive device 100 includes three conductive members 6, each conductive member 6 includes a pin portion 60. The pin portions 60 of the three conductive members 6 are respectively used as a U-phase pin end, a V-phase pin end and a W-phase pin end of an external interface, and the pin portions 60 of the three conductive members 6 are arranged side by side. Of course, the pin portions 60 of the three conductive members 6 can also be arranged in rows, and the specific arrangement position can be adaptively designed based on the external power supply interface. In addition, in this embodiment, the winding 22 in the stator assembly 2 corresponds to a three-phase winding, and the number of conductive members 6 is the same as the number of phases of the winding. Of course, when the winding 22 in the stator assembly 2 is a single-phase winding, the number of conductive members 6 can also be two. Referring to FIG. 2 to FIG. 5, the fluid drive device 100 further includes a ground member 9. One end of the ground member 9 can be in conductive contact with the stator core 21 in the stator assembly 2, and the other end of the ground member 9 is used as ground pin end of the external power supply interface, thereby facilitating leading out static electricity on the surface of the stator core 21 and further to prevent the static electricity from affecting the performance of the fluid drive device.

Referring to FIG. 5, FIG. 5 is a structural schematic view of the first embodiment in which a conductive member, a ground member and a pin are combined together. The structure of the corresponding conductive member in this embodiment will be described in detail below.

Referring to FIG. 6 to FIG. 9a, the conductive member 6 includes a main body portion 61, an end portion 62 and a pin portion 60, wherein the main body portion 61 is connected to the end portion 62 and the pin portion 60. In this embodiment, the end portion 62 is connected to an end in the lengthwise direction of the main body portion 61. The conductive member 6 further includes a first portion 63, and the first portion 63 is connected to the end portion 62 by means of a first connecting portion 64. The first portion 63 is arranged in an extending direction of the thickness of the end portion 62. It should be noted that the plane where an upper surface of the end portion is arranged is defined as a first reference plane, and the direction perpendicular to the first reference plane is defined as the extending direction of the thickness of the end portion 62. The extension direction of the thickness of the end mentioned here and hereinafter is the direction perpendicular to the first reference plane. Specifically, in this embodiment, the first portion 63 is arranged below the end portion 62. Of course, in other embodiments, the first portion 63 may be arranged above the end portion 62.

Figure 6:
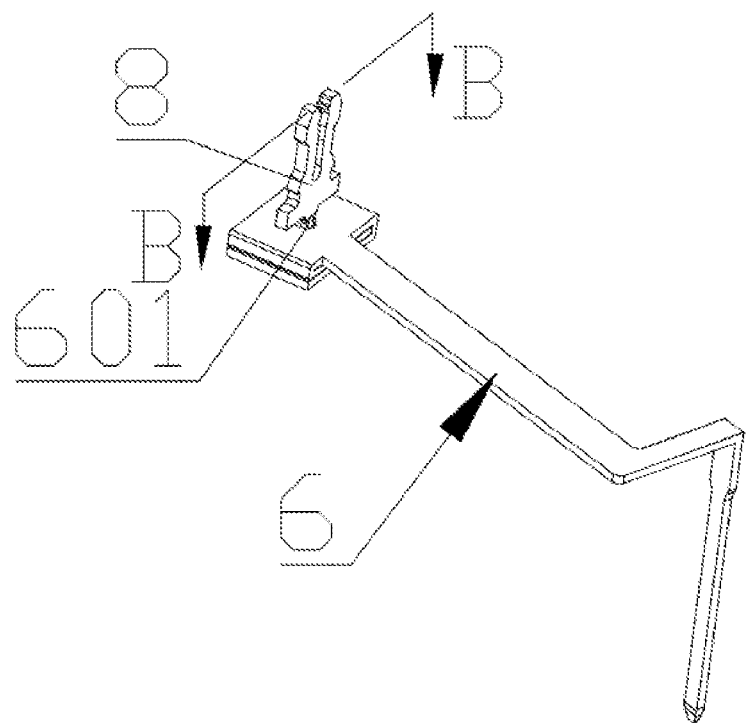
FIG. 6 is a perspective structural schematic view of the first embodiment in which the pin and one of the conductive members in FIG. 5 are combined together.
Figure 18:
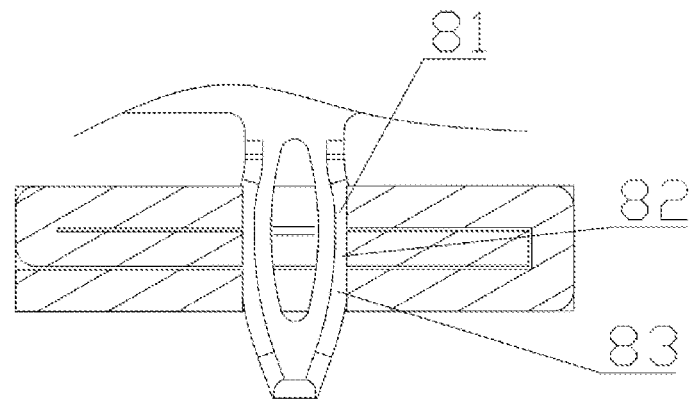
FIG. 18 is a cross-sectional structural schematic view cut along B-B in FIG. 6, looking toward the main body portion of the conductive member.

Referring to FIG. 6 to FIG. 9a, the conductive member 6 has a first hole 601 and a second hole 602. The first hole 601 is arranged to penetrate the end portion 62 along the thickness direction of the end portion 62, and the second hole 602 extends along the thickness direction of the first portion 63. In this embodiment, the second hole 602 is arranged to penetrate the first portion 63. Of course, in other embodiments, the second hole 602 may not penetrate the first portion 63. The first hole 601 is in communication with the second hole 602. As shown in FIG. 6 and FIG. 18, one end of the pin 8 extends into the first hole 601 and the second hole 602. The part corresponding to the pin 8 extending into the first hole 601 is defined as a first mating portion 81, and the part corresponding to the pin 8 extending into the second hole 602 is defined as a second mating portion 82. The pin 8 extending into the first hole 601, i.e. the first mating portion 81 is matched with the end portion 62, that is, limitedly connected to the end portion 62. The pin 8 extending into the second hole 602, that is, the second mating portion 82 is matched with the first portion 63, i.e. limitedly connected to the first portion 63. It should be noted that the limit connection mentioned here and below includes interference fit connection, transition fit connection and clearance fit connection. Furthermore, the conductive member 6 and the pin 8 can be made of rigid materials, and the limit connection here includes interference fit, transition fit and clearance fit connection between two structures of rigid materials. Of course, one of the conductive member 6 and the pin 8 can be elastically deformed. When the conductive member 6 and the pin 8 are connected, the interference fit and transition fit connection between the first hole 601 and the first mating portion 81 are realized through elastic deformation, the interference fit and transition fit connection between the second hole 602 and the second mating portion 82 are realized through elastic deformation. Specifically, in this embodiment, the pin 8 is extended into the first hole 601, that is, the first mating portion 81 is tightly fitted with the side wall corresponding to the first hole 601, and the pin 8 is extended into the second hole 602, that is, the second mating portion 82 is tightly fitted with the side wall corresponding to the second hole 602. The tight fit mentioned here and below refers to a tight connection achieved through interference fit or transition fit. By the tight fit, on one hand, the pin 8 can be supported, on the other hand, the pin 8 can contact with the conductive member 6 to achieve electrical connection. Of course, in other embodiments, the pin 8 is extended into the first hole 601, that is, the first mating portion 81 is in a clearance fit with the side wall corresponding to the first hole 601. And the pin 8 is extended into the second hole 602, that is, the second mating portion 82 is also in a clearance fit with the side wall corresponding to the second hole 602. In that case, the pin 8 can be electrically connected to the conductive member 6 by soldering or the like. In the above way, the pin 8 is inserted into the first hole 601 and the second hole 602, that is, the first mating portion 81 is limitedly connected to the first hole 601, and the second mating portion 82 is limitedly connected to the second hole 602. As such, it is beneficial to increase the mating height between the pin 8 and the conductive member 6, thereby facilitating of improving the support strength between the pin 8 and the conductive member 6, thus facilitating improving the reliability of the electrical connection between the pin 8 and the conductive member 6. On the other hand, the thickness of the end portion 62 can be reduced by the above-mentioned way, thereby facilitating of reducing the production cost of the conductive member 6.

Figure 7:
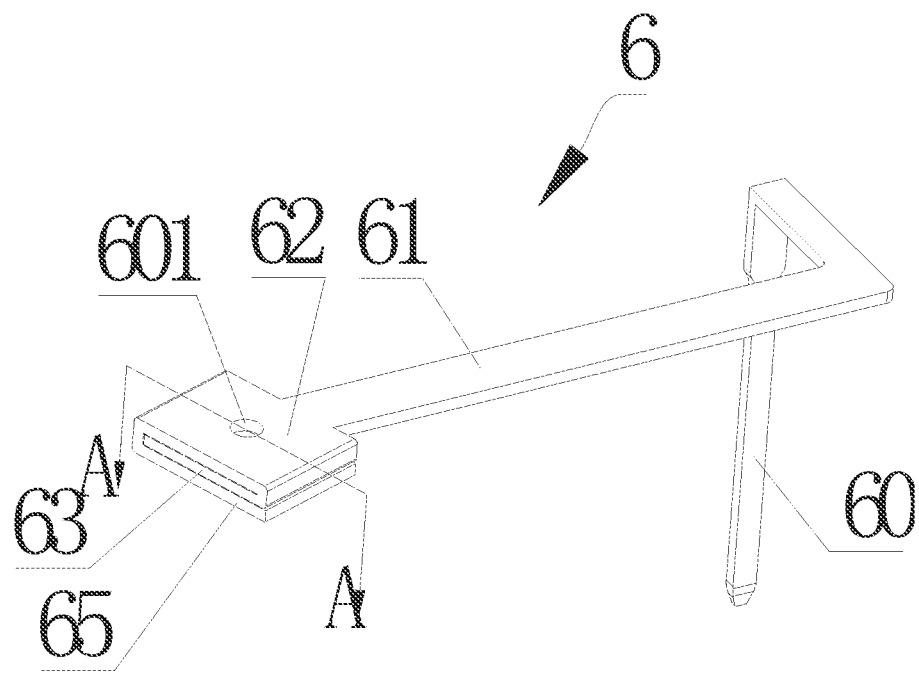
FIG. 7 is a perspective structural schematic view of the conductive member in FIG. 6.
Figure 8:
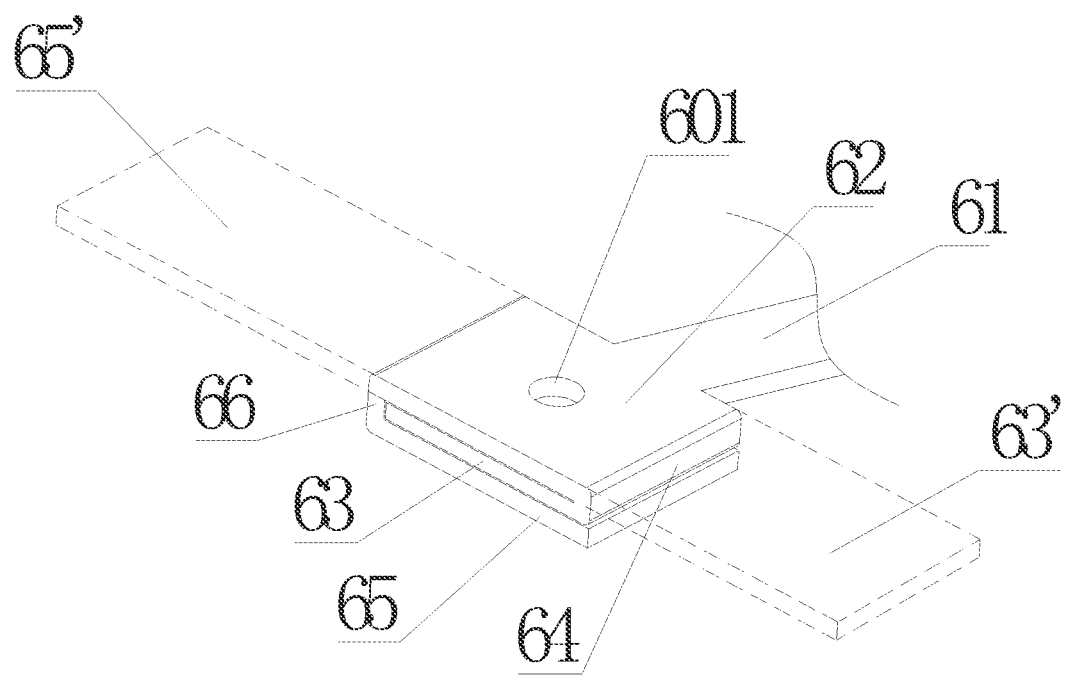
FIG. 8 is a partially enlarged structural schematic view of the conductive member in FIG. 7.

Referring to FIG. 7 and FIG. 8, in this embodiment, the first portion 63 is formed by bending. For the sake of description, referring to FIG. 8, the dotted line shows the first portion 63' in the unfolded state, and the first connecting portion 64 and the first portion 63 are formed by bending the first portion 63' in the unfolded state. The first portion 63 is arranged in the extending direction of the thickness of the end portion 62.

Figure 9A:
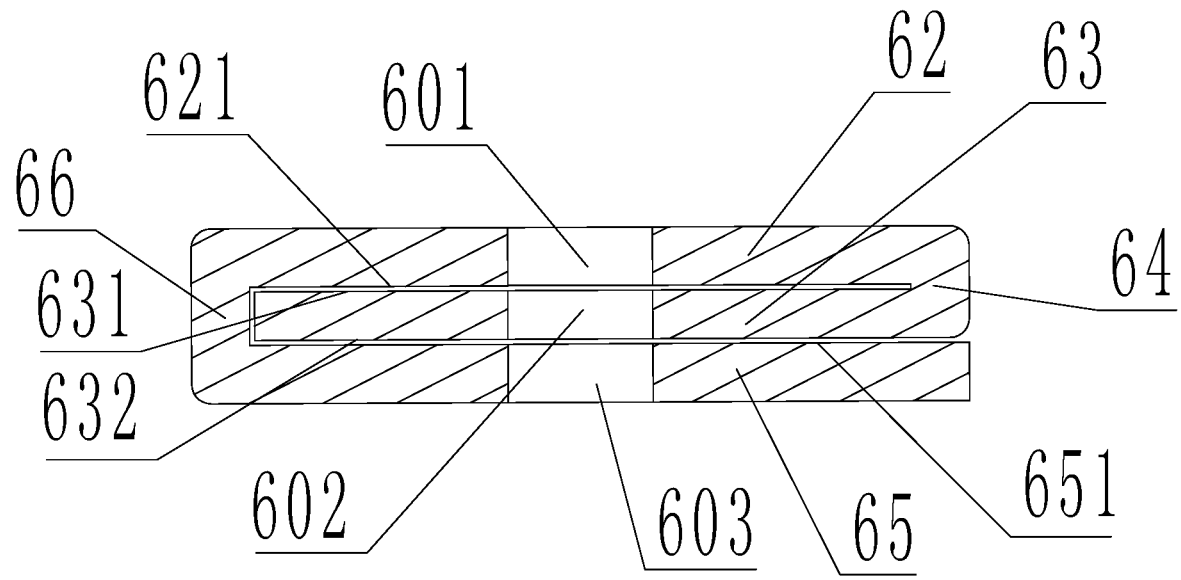
FIG. 9a is a cross-sectional structural schematic view of a first embodiment cut along A-A in FIG. 7.

Referring to FIG. 8 and FIG. 9a, the first connecting portion 64 is connected to one end in the lengthwise direction of the end portion 62 and one end in the lengthwise direction of the first portion 63. The plane where the first connecting portion 64 is arranged is defined as a second reference plane. And the lengthwise direction of the end portion 62 mentioned here and below is the direction perpendicular to the second reference plane. Along the extension direction of the thickness of the end portion 62, a first surface 631 of the first portion 63 is arranged in contact with a first surface 621 of the end portion 62, and the second surface 632 of the first portion 63 is arranged opposite to the first surface 621 of the end portion 62. Of course, in other embodiments, a gap can be provided between the first surface 631 of the first portion 63 and the first surface 621 of the end portion 62. In this way, when the conductive member 6 is injection-molded as an embedded member, the gap between the first surface 631 of the first portion 63 and the first surface 621 of the end portion 62 will be filled with injection-molded material, thereby increasing a contact area between the conductive member 6 and the limiting member 5, and further improving the connection strength between the conductive member 6 and the limiting member 5. In conjunction with FIG. 4 and FIG. 9a, if the height of the pin 8 used for mating with the conductive member 6 is less than the total height of the first hole 601 and the second hole 602, and the first surface 631 of the first portion 63 is arranged to be in contact with the first surface 621 of the end portion 62, it is beneficial to improve the actual utilization of the mating between the first hole 601 and the second hole 602 and the pin 8, thus improving the reliability of the electrical connection between the pin 8 and the conductive member 6. Referring to FIG. 8 and FIG. 9*a*, in this embodiment, the thickness of the end portion 62 is less than or equal to 1.5 mm. The thickness of the end portion 62 is the same as that of the first portion 63. In this way, the thickness of the end portion 62 is set within the above range, and it is more beneficial to form the end portion 62 and the first portion 63 during the following bending.

Referring to FIG. 8 and FIG. 9*a*, in this embodiment, there are two ways to realize the contact between the first surface 621 of the first portion 63 and the first surface 631 of the end portion 62. In a first way, the first portion 63 is arranged in the extension direction of the thickness of the end portion 62 by bending the first portion 63' in the unfolded state, at this time, the first surface 631 of the bent first portion 63 is in contact with the first surface 621 of the end portion 62. In a second way, the first portion 63 is arranged in the extending direction of the thickness of the end portion 62 by bending the first portion 63' in the unfolded state, and then pressure is applied to the bent first portion 63 and the end portion 62, so that the first surface 631 of the bent first portion 63 is in contact with the first surface 621 of the end portion 62.

Referring to FIG. 8 and FIG. 9*a*, in this embodiment, the conductive member 6 further includes a second portion 65, the second portion 65 is connected to the other end of the end portion 62. The second portion 65 and the first portion 63 are provided in layers along the extending direction of the thickness of the end portion 62. In this embodiment, the second portion 65 is arranged below the first portion 63, and a first surface 651 of the second portion 65 is in contact with a second surface 632 of the first portion 63. In this embodiment, the end portion 62, the first portion 63 and the second portion 65 are provided in a laminated order sequentially from top to bottom along the extending direction of the thickness of the end portion 62. Of course, in other embodiments, the first portion 63 may be arranged above the end portion 62, in this case, the second portion 65 may be arranged below the end portion 62 or the second portion 65 may be also arranged above the first portion 63. By providing the second portion 65 in this way, the stability of the conductive member 6 can be increased when the conductive member 6 is injection-molded as an embedded member. Referring to FIG. 8 and FIG. 9*a*, in this embodiment, the thickness of the second portion 65 is less than or equal to 1.5 mm. The thickness of the second portion 65 is the same as that of the end portion 62. In this way, the thickness of the second portion 65 is set within the above range, thereby more facilitating the formation of the second portion 65.

Referring to FIG. 8 and FIG. 9*a*, the conductive member 6 further includes a second connecting portion 66. The connecting portion 66 is connected to one end of the second portion 65 and the other end of the end portion 62. In this embodiment, the second connecting portion 66 is provided in parallel with the first connecting portion 64.

Referring to FIG. 8, in this embodiment, the second portion 65 is formed by bending. For the sake of description, referring to FIG. 8, the dotted line shows the second portion 65' in an unfolded state, the second portion 65' in the unfolded state is provided in parallel with the first portion 63' in the unfolded state, and the length of the second portion 65' in the unfolded state is greater than that of the first portion 63' in the unfolded state. By bending the second portion 65' in the unfolded state, the second portion 65 and the first portion 63 can be provided in layers. Here, the way to realize the contact between the second portion 65 and the first portion 63 can refer to the way of realizing the contact between the first portion 63 and the end portion 62, and will not be repeated here. Specifically, the end portion 62, the first portion 63 and the second portion 65 in FIG. 8 can be in flat plate structure, which is elongated in shape, and the structure shown in FIG. 9*a* can be formed by folding both ends of the elongated flat plate structure toward the same side. Alternatively, one end of the elongated flat plate structure is continuously bent twice to form the structure shown in FIG. 9*b*, and the two bending directions are both in counterclockwise direction.

Figure 19:
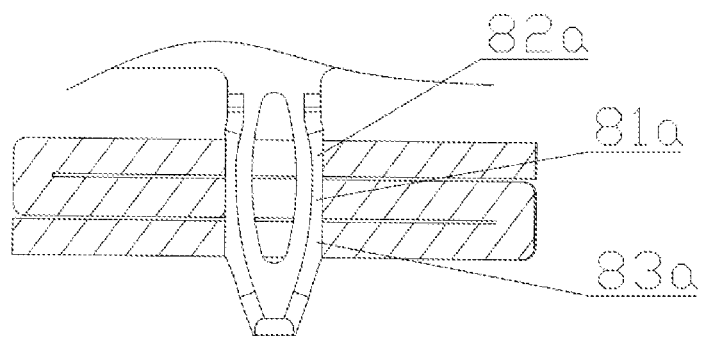
FIG. 19 is a cross-sectional structural schematic view cut along B-B in FIG. 10, looking toward the main body portion of the conductive member.
Figure 20:
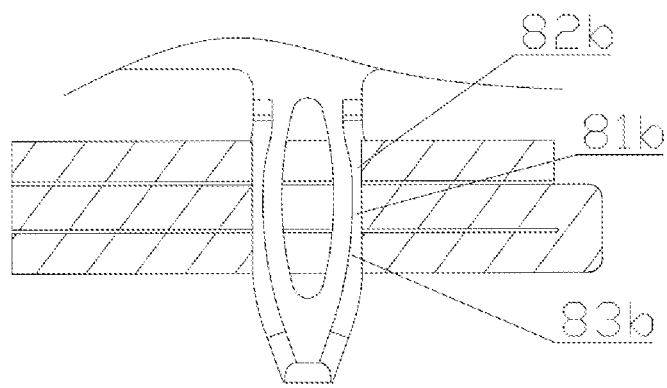
FIG. 20 is a cross-sectional structural schematic view cut along B-B in FIG. 14, looking toward the main body portion of the conductive member.

As shown in FIG. 6, FIG. 9*a* and FIG. 18, the conductive member 6 has a third hole 603, the third hole 603 is provided to penetrate along the thickness direction of the second portion 65. The third hole 603 is in communication with both the first hole 601 and the second hole 602, the three holes can be circular holes and provided coaxially. In conjunction with FIG. 6, one end of the pin 8 extends into the third hole 603, and the part corresponding to the pin extending into the third hole is defined as a third mating portion. The pin 8 is extended into the third hole 603, that is, the third mating portion 83 is matched with the side wall corresponding to the third hole 603, i.e. limitedly connected to the side wall corresponding to the third hole 603. Specifically, in this embodiment, the pin 8 is extended into the third hole 603, i.e. the third mating portion 83 is tightly fitted with the side wall corresponding to the third hole 603. By the tight fit, on one hand, the pin 8 can be supported, and on the other hand, the pin 8 can contact with the side wall corresponding to the third hole 603 to realize the connection. Of course, in other embodiments, the pin 8 is extended into the third hole 603, i.e. the third mating portion 83 may be in a clearance fit with the side wall corresponding to the third hole 603. At this time, the pin 8 can be electrically connected to the conductive member 6 by soldering or the like. In the above-mentioned way, the pin 8 can also be inserted into the third hole 603, thereby facilitating of further increasing the mating height between the pin 8 and the conductive member 6, thus facilitating of improving the support strength between the pin 8 and the conductive member 6, and thus facilitating of improving the reliability of the electrical connection between the pin 8 and the conductive member 6. On the other hand, the thickness of the end portion 62 can be further reduced in the above-mentioned way, thereby facilitating of reducing the production cost of the conductive member 6. In addition, in this embodiment, the conductive member 6 is provided with a second portion 65, but in other embodiments, the second portion 65 may not be provided. In FIG. 18, a hole is provided in a middle part of a portion, used for inserting into the conductive member 6, of the pin 8. And one end of this portion is configured for guiding, which facilitates of being inserted into the first hole, the second hole and the third hole. Said hole facilitates the deformation of the pin 8 when being inserted so as to be tightly fitted with the side walls of the first hole, the second hole and the third hole. The pin 8 in FIG. 19 and FIG. 20 is similar in structure and can be understood by reference.

Figure 9B:
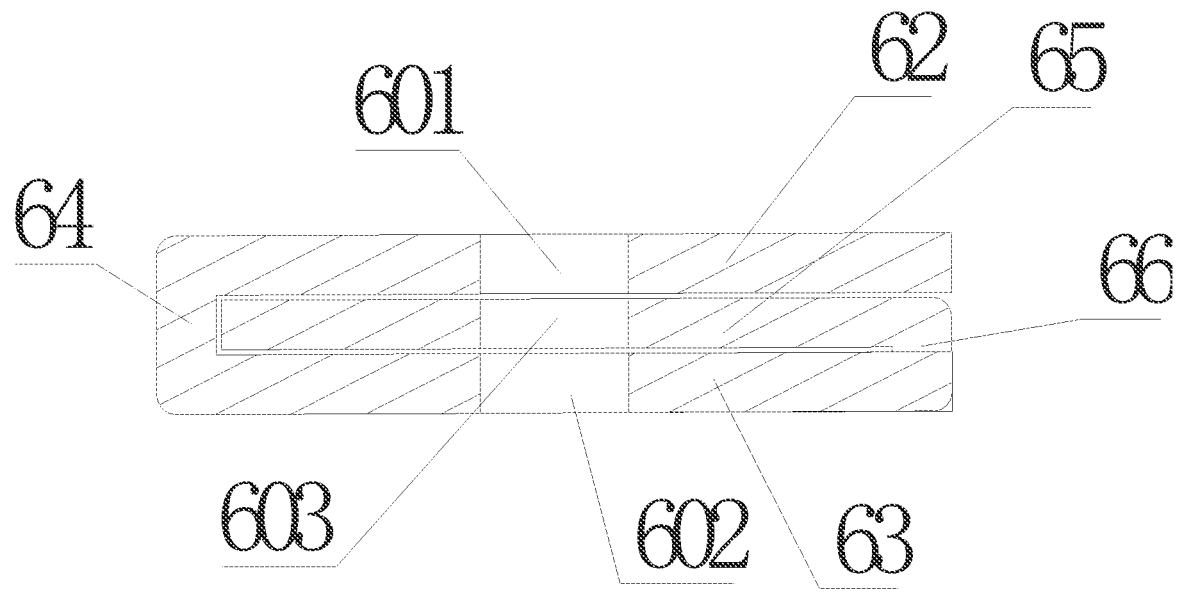
FIG. 9b is a cross-sectional structural schematic view of a second embodiment cut along A-A in FIG. 7.

Referring to FIG. 9*a*, in this embodiment, one end of the first portion 63 is connected to one end of the end portion 62 by the first connecting portion 64, and one end of the second portion 65 is connected to the other end of the end portion 62 by the second connecting portion 66, and the first connecting portion 64 is provided in parallel with the second connecting portion 66. Of course, in other embodiments, as shown in FIG. 9*b*, the second portion 65 is arranged between the end portion 62 and the first portion 63. The first portion 63 is connected to one end of the end portion 62 by the first connecting portion 64, and the second portion 65 is connected to one end of the first portion 63 by the second connecting portion 66. The first connecting portion 64 is provided in parallel with the second connecting portion 66, and the third hole 603 is arranged between the first hole 601 and the second hole 602. With this arrangement, the connection strength between the end portion 62 and the second portion 65 can be improved, thus facilitating of improving the service life of the conductive member 6.

Figure 10:
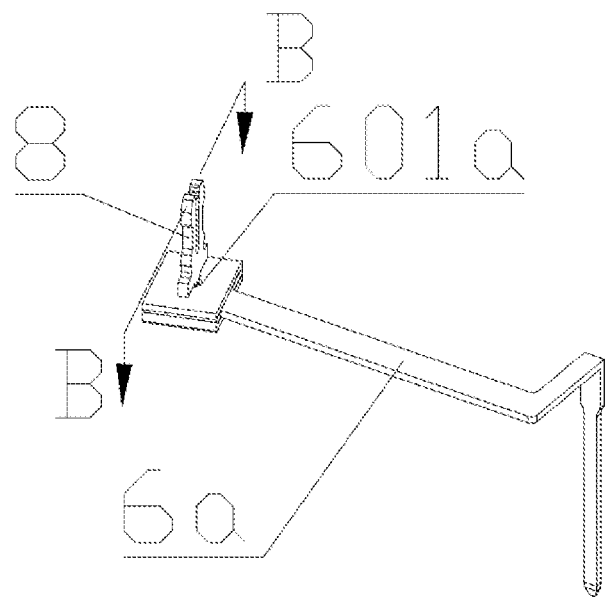
FIG. 10 is a perspective structural schematic view of a second embodiment in which the pin and one of the conductive members in FIG. 5 are combined together.

Referring to FIG. 10, FIG. 10 is a structural schematic view of a second embodiment of the conductive member. The structure of the conductive member in this embodiment will be described in detail below.

Referring to FIG. 10 to FIG. 13a, a conductive member 6a includes a main body portion 61a, an end portion 62a and a first portion 63a, and one end of the first portion 63a is connected to one end of the end portion 62a by a first connecting portion 64a. The first portion 63a is arranged in an extending direction of the thickness of the end portion 62a. Specifically, in this embodiment, the first portion 63a is arranged above the end portion 62a. Of course, in other embodiments, the first portion 63a may also be arranged below the end portion 62a.

Figure 11:
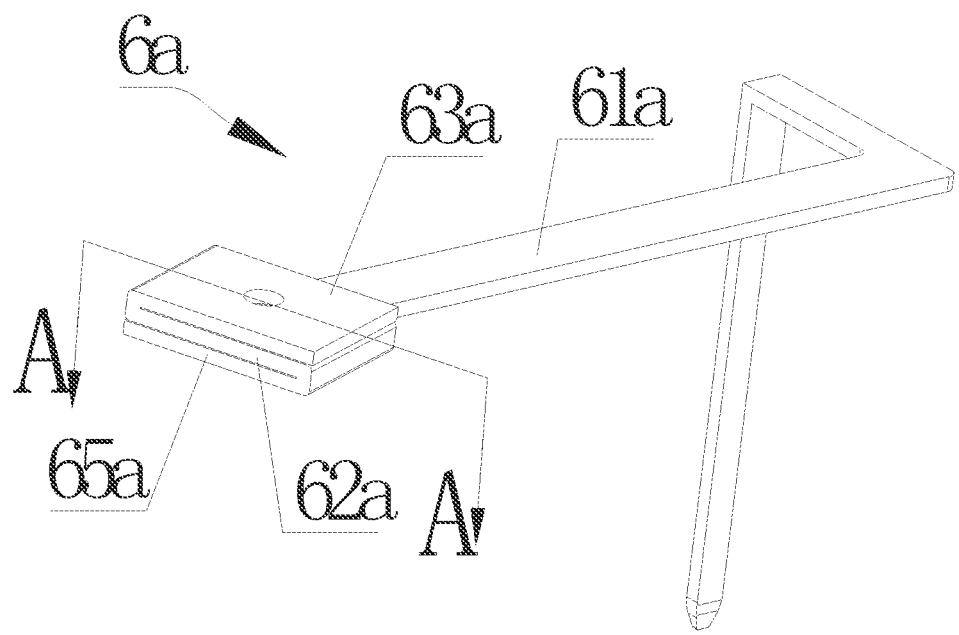
FIG. 11 is a perspective structural schematic view of the conductive member in FIG. 10.
Figure 13A:
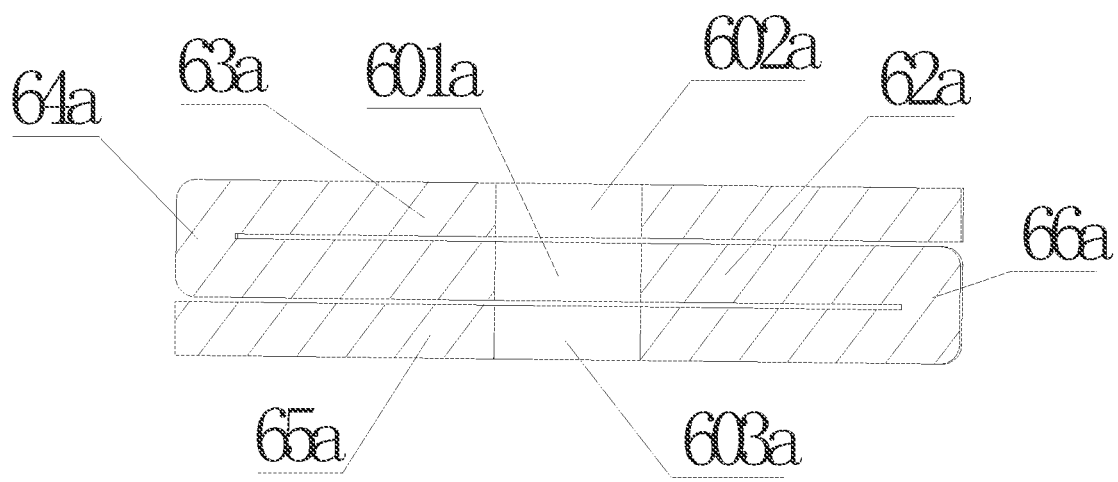
FIG. 13a is a sectional structural schematic view of a first embodiment cut along A-A in FIG. 11.
Figure 13B:
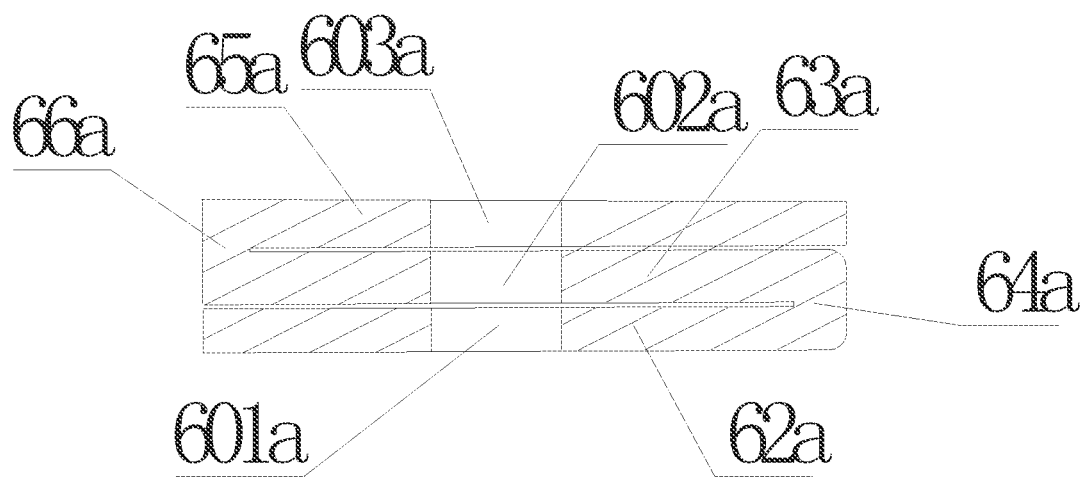
FIG. 13b is a sectional structural schematic view of a second embodiment cut along A-A in FIG. 11.

Referring to FIG. 13a, the conductive member 6a has a first hole 601a and a second hole 602a. The first hole 601a is arranged to penetrate the end portion 62a in the thickness direction of the end portion 62a, and the second hole 602a is arranged to penetrate the first portion 63a along the thickness direction of the first portion 63a. The first hole 601a is in communication with the second hole 602a. In this embodiment, the first hole 601a is arranged below the second hole 602a. Referring to FIG. 10, FIG. 11 and FIG. 19, one end of the pin 8 extends into the first hole 601a and the second hole 602a. The corresponding part of the pin extending into the first hole 601a is defined as a first mating portion 81a, and the corresponding part of the pin extending into the second hole 602a is defined as a second mating portion 82a. The pin 8 is extended into the first hole 601a, i.e. the first mating portion 81a is matched with the first hole 601a, that is, limitedly connected to the first hole 601a. The pin 8 is extended into the second hole 602a, i.e. the second mating portion 82a is matched with the second hole 602a, that is, limitedly connected to the second hole 602a. Specifically, in this embodiment, the pin 8 is extended into the first hole 601a, i.e. the first mating portion 81a is tightly fitted with the side wall corresponding to the first hole 601a. And the pin 8 is extended into the second hole 602a, i.e. the second mating portion 82a is tightly fitted with the side wall corresponding to the second hole 602a. By the tight fit, on one hand, the pin 8 can be supported, on the other hand, the pin 8 can contact with the conductive member 6 to achieve electrical connection. Of course, in other embodiments, the pin 8 extending into the first hole 601a may also be in a clearance fit with the side wall corresponding to the first hole 601a. And the pin 8 extending into the second hole 602a may also be in a clearance fit with the side wall corresponding to the second hole 602a. In that case, the pin 8 can be electrically connected to the conductive member 6a by soldering or the like. In the above way, the pin 8 can extend into the first hole 601a and the second hole 602a. As such, it is beneficial to increase the mating height between the pin 8 and the conductive member 6a, thus facilitating of improving the support strength between the pin 8 and the conductive member 6a, and facilitating of further improving the reliability of the electrical connection between the pin 8 and the conductive member 6a. On the other hand, the thickness of the end portion 62a can be reduced by the above-mentioned way, thereby facilitating of reducing the production cost of the conductive member.

Figure 12:
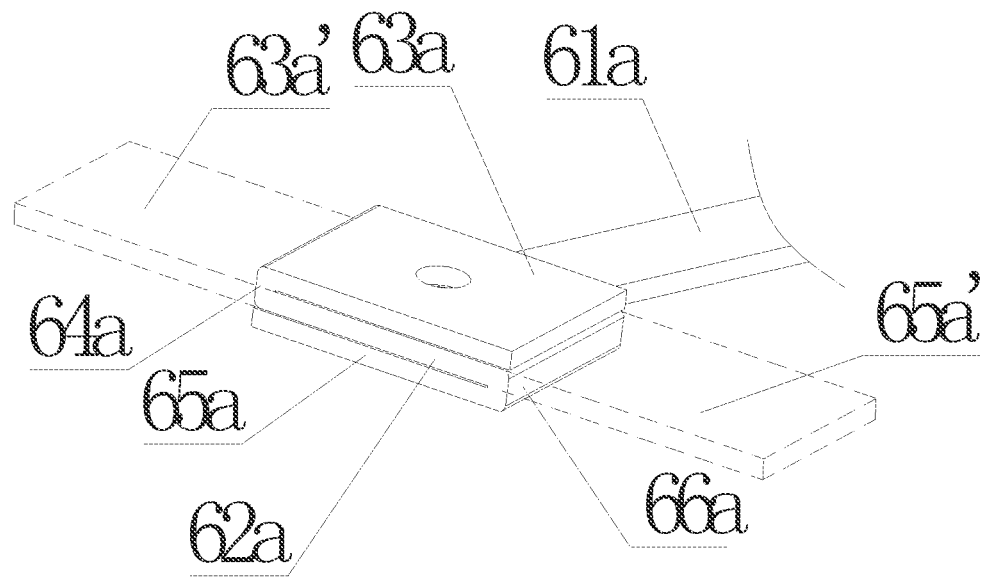
FIG. 12 is a partially structural schematic view of the conductive member in FIG. 11.

Referring to FIG. 12 and FIG. 13a, in this embodiment, the conductive member 6a further includes a second portion 65a and a second connecting portion 66a. In this embodiment, the second connecting portion 66a is provided in parallel with the first connecting portion 64a. The second portion 65a is connected to the other end of the end portion 62a by the second connecting portion 66a. The second portion 65a is arranged in an extending direction of the thickness of the end portion 62a, and the second portion 65a is provided to be laminated with the end portion 62a. In this embodiment, the end portion 62a is arranged between the first portion 63a and the second portion 65a, the second portion 65a is arranged below and in contact with the end portion 62a, and the first portion 63a is arranged above and in contact with the end portion 62a. In other words, in this embodiment, the first portion 63a, the end portion 62a and the second portion 65a are provided in a laminated order sequentially from top to bottom along the extending direction of the thickness of the end portion 62a. Of course, in other embodiments, the second portion 65a can also be connected to the first portion 63a, and there are two kind of lamination cases at this time. In the first case, the end portion 62a, the first portion 63a and the second portion 65a are provided in a laminated order sequentially from top to bottom along the extending direction of the thickness of the end portion 62a. In the second case, the second portion 65a, the first portion 63a, and the end portion 62a are provided in a laminated order sequentially from top to bottom along the extending direction of the thickness of the end portion 62a. The arrangement of this structure can ensure the stability of the conductive member 6 during injection molding while can also reduce the consumed amount of material of the conductive member 6, facilitating of saving the cost of the conductive member 6.

Referring to FIG. 12 and FIG. 13a, the conductive member 6a has a third hole 603a, the third hole 603a is arranged to penetrate the second portion 65a along the thickness direction of the second portion 65a. The third hole 603a is in communication with both the first hole 601a and the second hole 602a, the three holes can be circular holes and arranged coaxially. Referring to FIG. 10 and FIG. 19, one end of the pin 8 extends into the third hole 603a, and the corresponding part of the pin extending into the third hole 603a is defined as a third mating portion 83a. The pin 8 is extended into the third hole 603a, that is, the third mating portion 83 is matched with the side wall corresponding to the third hole 603a, i.e. limitedly connected to the side wall corresponding to the third hole 603a. Specifically, in this embodiment, the pin 8 is extended into the third hole 603a, i.e. the third mating portion 83a is tightly fitted with the side wall corresponding to the third hole 603a. By the tight fit, on one hand, the pin can be supported, and on the other hand, the pin 8 can contact with the side wall corresponding to the third hole 603a to realize electrical connection. Of course, in other embodiments, the pin 8 extending into the third hole 603a may be in a clearance fit with the side wall corresponding to the third hole 603a. In that case, the pin 8 can be electrically connected to the conductive member 6a by soldering or the like. In the above-mentioned way, the pin 8 can also extend into the third hole 603a. As such, on one hand, it is beneficial to increase the mating height between the pin 8 and the conductive member 6a, thus facilitating of further improving the support strength between the pin 8 and the conductive member 6a, and further facilitating of improving the reliability of the electrical connection between the pin 8 and the conductive member 6a. On the other hand, the thickness of the end portion 62a can be reduced by the above-mentioned way, thereby facilitating of reducing the production cost of the conductive member.

Referring to FIG. 12, in this embodiment, the first portion 63a and the second portion 65a are formed by bending. For the sake of description, referring to FIG. 12, the dotted line shows the first portion 63a' is in an unfolded state and the second portion 65a' is in an unfolded state. The first portion 63a' in the unfolded state is provided in parallel with the second portion 65a' in the unfolded state. By bending the first portion 63' in the unfolded state and the second portion 65a' in the unfolded state, the first portion 63a, the end portion 62a and the second portion 65a can be provided in a laminated manner. Specifically, the end portion 62a, the first portion 63a' and the second portion 65a' in FIG. 12 can be in flat plate structure, which is elongated in shape, and the structure shown in FIG. 13a can be formed by folding both ends of the elongated flat plate structure to both sides, respectively. Alternatively, one end of the elongated flat plate structure is continuously bent twice to form the structure shown in FIG. 13b, and the twice bends are made in a counterclockwise direction and a clockwise direction, respectively. The S-shape is formed by bending in FIG. 13a and FIG. 13b.

Referring to FIG. 13a, in this embodiment, one end of the first portion 63a is connected to one end of the end portion 62a by the first connecting portion 64a, and one end of the second portion 65a is connected to the other end of the end portion 62a by the second connecting portion 66a. And the first connecting portion 64a is provided in parallel with the second connecting portion 66a. Of course, in other embodiments, referring to FIG. 13b, the first portion 63a is arranged between the end portion 62a and the second portion 65a. The first portion 63a is connected to one end of the end portion 62a by the first connecting portion 64a, and the second portion 65a is connected to one end of the first portion 63a by the second connecting portion 66a. The first connecting portion 64a is provided in parallel with the second connecting portion 66a, and the third hole 603a is arranged above the second hole 602a.

Compared with the first embodiment of the conductive member, the folding manner of the conductive member is different in this embodiment. In this embodiment, other structures of the conductive member can refer to that of the first embodiment of the conductive member, and will not be repeated here.

Figure 14:
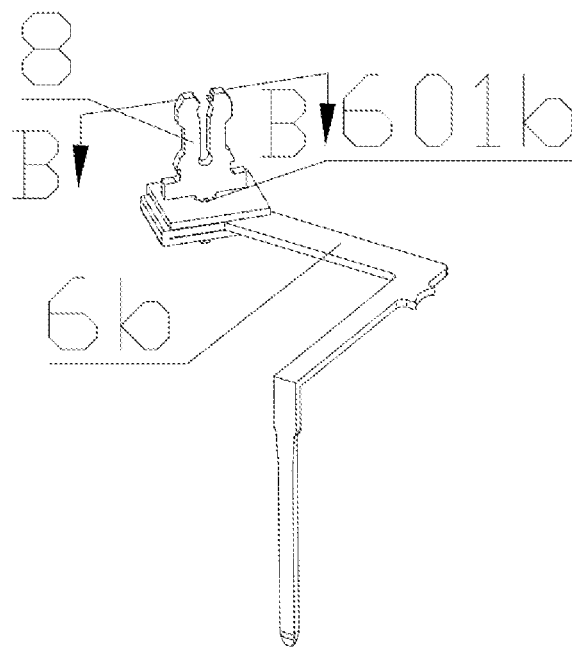
FIG. 14 is a perspective structural schematic view of a third embodiment in which the pin and one of the conductive members in FIG. 5 are combined together.
Figure 15:
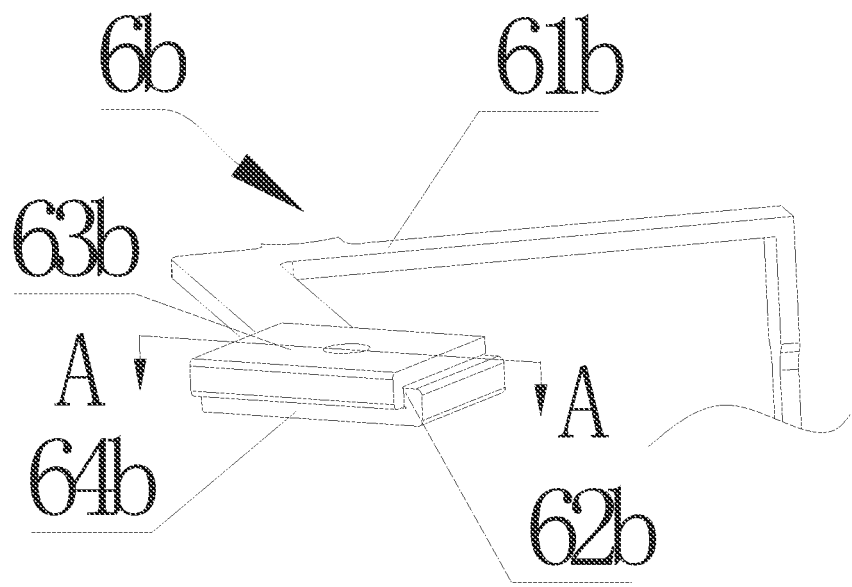
FIG. 15 is a perspective structural schematic view of the conductive member in FIG. 14.

Referring to FIG. 14, FIG. 14 is a structural schematic view of a third embodiment in which a conductive member and a pin are assembled together. The structure of the conductive member in this embodiment will be described in detail below.

Referring to FIG. 14 to FIG. 17 and FIG. 20, a conductive member 6b includes a main body portion 61b, an end portion 62b and a first portion 63b. One end of the first portion 63b is connected to one end of the end portion 62b by a first connecting portion 64b. The first portion 63b is arranged in an extending direction of the thickness of the end portion 62b. Specifically, in this embodiment, the first portion 63b is arranged above the end portion 62b.

Figure 17:
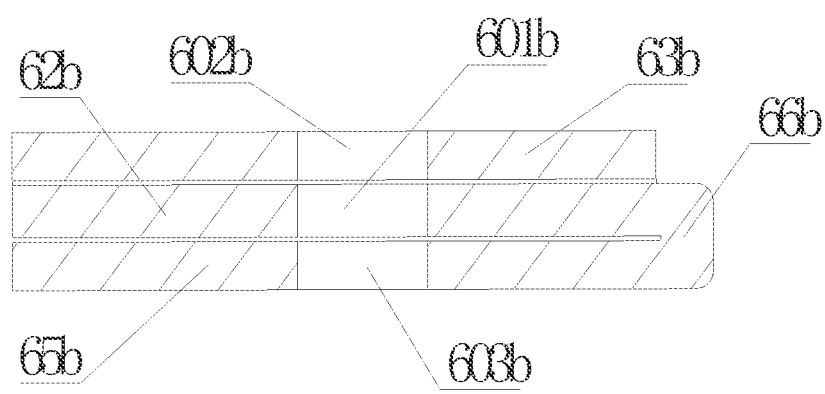
FIG. 17 is a cross-sectional structural schematic view cut along A-A in FIG. 15.

Referring to FIG. 17, the conductive member 6b has a first hole 601b and a second hole 602b. The first hole 601b is arranged to penetrate the end portion 62b in the thickness direction of the end portion 62b, and the second hole 602b is arranged to penetrate the first portion 63b in the thickness direction of the first portion 63b. The first hole 601b is in communication with the second hole 602b. In this embodiment, the first hole 601b is arranged below the second hole 602b. Referring to FIG. 14 and FIG. 20, one end of the pin 8 extends into the first hole 601b and the second hole 602b. The corresponding part of the pin extending into the first hole 601b is defined as a first mating portion 81b, and the corresponding part of the pin extending into the second hole 602b is defined as a second mating portion 82b. The pin 8 is extended into the first hole 601b, i.e. the first mating portion 81b is matched with the first hole 601b, that is, limitedly connected to the first hole 601b. The pin 8 is extending into the second hole 602b, i.e. the second mating portion 82b is matched with the second hole 602b, that is, limitedly connected to the second hole 602b. Specifically, in this embodiment, the pin 8 is extending into the first hole 601b, i.e. the first mating portion 81b is tightly fitted with the side wall corresponding to the first hole 601b. And the pin 8 is extended into the second hole 602b, i.e. the second mating portion 82b is tightly fitted with the side wall corresponding to the second hole 602b. With the tight fit, on one hand, the pin 8 can be supported, on the other hand, the pin 8 can contact with the conductive member 6b to achieve electrical connection. Of course, in other embodiments, the pin 8 extending into the first hole 601b may also be in a clearance fit with the side wall corresponding to the first hole 601a. And the pin 8 extending into the second hole 602b can also be in a clearance fit with the side wall corresponding to the second hole 602b. In that case, the pin 8 can be electrically connected to the conductive member 6b by soldering or the like. In the above way, the pin 8 can extend into the first hole 601b and the second hole 602b. As such, it is beneficial to increase the mating height between the pin 8 and the conductive member 6b, thus facilitating of improving the support strength between the pin 8 and the conductive member 6b, and further facilitating of improving the reliability of the electrical connection between the pin 8 and the conductive member 6b. On the other hand, the thickness of the end portion 62b can be reduced by the above-mentioned way, thereby facilitating of reducing the production cost of the conductive member.

Referring to FIG. 14 to FIG. 17, in this embodiment, the conductive member 6b further includes a second portion 65b and a second connecting portion 66b. One end of the second portion 65b is connected to the other end of the end portion 62b by the second connecting portion 66b. And in this embodiment, the second connecting portion 66b is arranged perpendicular to the first connecting portion 64b, so that the second connecting portion 66b and the first connecting portion 64b are arranged close to each other, facilitating of improving the connection strength between the end portion 62b and the first portion 63b, as well as the connection strength between the end portion 62b and the second portion 65b, thereby improving the service life of the conductive member 6. The second portion 65b is arranged in the extending direction of the thickness of the end portion 62b, and the second portion 65b and the end portion 62b are provided in a laminated manner. In this embodiment, the second portion 65b is arranged below and in contact with the end portion 62b, and the first portion 63b is arranged above and in contact with the end portion 62b. That is, in this embodiment, the first portion 63b, the end portion 62b, and the second portion 65b are arranged in a laminated order sequentially from top to bottom along the extending direction of the thickness of the end portion 62b. Of course, in other embodiments, there are two other kinds of cases of laminating. In the first case, the first portion 63b, the second portion 65b and the end portion 62b are arranged in a laminated order sequentially from top to bottom along the extending direction of the thickness of the end portion 62b. In the second case, the second portion 65b, the first portion 63b, and the end portion 62b are arranged in a laminated order sequentially from top to bottom along the extending direction of the thickness of the end portion 62b.

Referring to FIG. 14 to FIG. 17, the conductive member 6b has a third hole 603b, the third hole 603b is arranged to penetrate the second portion 65b along the thickness direction of the second portion 65b. The third hole 603b is in communication with both the first hole 601b and the second hole 602b, these three holes can be circular holes and arranged coaxially. One end of the pin 8 extends into the third hole 603b, and the part corresponding to the pin extending into the third hole 603b is defined as a third mating portion 83b. The pin 8 is extended into the third hole 603b, i.e. the third mating portion 83b is matched with the side wall corresponding to the third hole 603b, that is, limitedly connected to the side wall corresponding to the third hole 603b. Specifically, in this embodiment, the pin 8 is extended into the third hole 603b, i.e. the third mating portion 83b is tightly fitted with the side wall corresponding to the third hole 603b. By the tight fit, on one hand, the pin 8 can be supported, on the other hand, the pin 8 can contact with the side wall corresponding to the third hole 603b to realize electrical connection. Of course, in other embodiments, the pin 8 extending into the third hole 603b may be also in a clearance fit with the side wall corresponding to the third hole 603b. In that case, the pin 8 can be electrically connected to the conductive member 6b by soldering or the like. In the above way, the pin 8 can also extend into the third hole 603. As such, on one hand, it is beneficial to increase the mating height between the pin 8 and the conductive member 6b, further facilitating of improving the support strength between the pin 8 and the conductive member 6b, and further facilitating of improving the reliability of the electrical connection between the pin 8 and the conductive member 6b. On the other hand, the thickness of the end portion 62b can be reduced by the above-mentioned way, thereby facilitating of reducing the production cost of the conductive member 6b.

Figure 16:
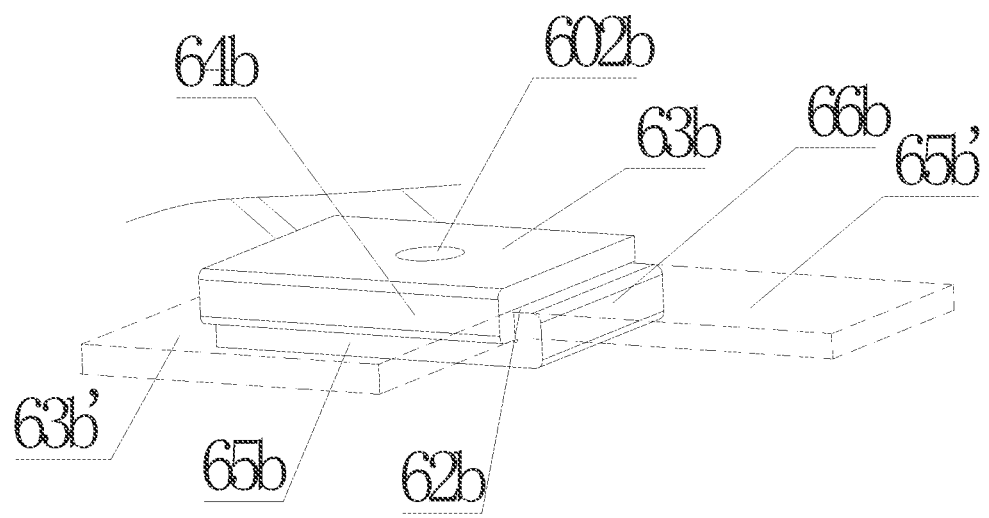
FIG. 16 is a partially structural schematic view of the conductive member in FIG. 15.

Referring to FIG. 16, in this embodiment, the first portion 63b and the second portion 65b are formed by bending. For the sake of description, referring to FIG. 16, the dotted line shows the first portion 63b' in an unfolded state and the second portion 65b' in an unfolded state. The first portion 63a' in the unfolded state is arranged perpendicular to the second portion 65b' in the unfolded state. By bending the first portion 63' in the unfolded state and the second portion 65b' in the unfolded state, the first portion 63b, the end portion 62b and the second portion 65b can be arranged in a laminated manner. Specifically, the end portion 62b, the first portion 63b' and the second portion 65b' in FIG. 16 can be in flat plate structure, which is L-shaped. And the structure shown in FIG. 17 can be formed by folding both ends of the L-shaped flat plate structure to both sides respectively.

It should be noted that, the above embodiments are only used to illustrate the present application rather than limit the technical solutions described in the present application. Although the present application is described in detail in this specification with reference to the above embodiments, those of ordinary skill in the art should understand that those skilled in the art may still modify or equivalently replace the present application, and all technical solutions and improvements thereof that do not depart from the spirit and scope of the present application shall be covered within the scope of the claims of the present application.

The invention claimed is:
1. A fluid drive device, wherein the fluid drive device comprises a stator assembly, a pin and a conductive member, the pin is electrically connected to a winding of the stator assembly and the conductive member; the conductive member comprises a main body portion, an end portion and a pin portion,
wherein the main body portion is connected to the end portion and the pin portion, and the pin portion is able to be configured as a pin end electrically connected to an external power supply; the conductive member further comprises a first portion and a first connecting portion, wherein the first portion is connected to the end portion at least by the first connecting portion; the first portion is arranged in an extending direction of the thickness of the end portion; the conductive member has a first hole and a second hole, the first hole is arranged to penetrate the end portion along the thickness direction of the end portion, and the second hole extends along the thickness direction of the first portion; the first hole is in communication with the second hole, and
wherein, the pin extends into the first hole and the second hole, and the corresponding part of the pin extending into the first hole is defined as a first mating portion, and the corresponding part of the pin extending into the second hole is defined as a second mating portion, the first mating portion is limitedly connected to a side wall corresponding to the first hole, and the second mating portion is limitedly connected to a side wall corresponding to the second hole.

2. The fluid drive device according to claim 1, wherein the second hole is arranged to penetrate the first portion; the first mating portion is tightly fitted with the side wall corresponding to the first hole, and the second mating portion is tightly fitted with the side wall corresponding to the second hole.

3. The fluid drive device according to claim 2, wherein the first connecting portion is connected to one end of the end portion and one end of the first portion, and the thickness of the end portion is less than or equal to 1.5 mm.

4. The fluid drive device according to claim 1, wherein the first connecting portion is connected to one end of the end portion and one end of the first portion, and the thickness of the end portion is less than or equal to 1.5 mm.

5. The fluid drive device according to claim 4, wherein the conductive member further comprises a second portion and a second connecting portion, and the second portion is connected to the end portion at least by the second connecting portion or the second portion is connected to the first portion at least by the second connecting portion; the second portion is arranged in the extending direction of the thickness of the end portion.

6. The fluid drive device according to claim 5, wherein when the second portion is connected to the end portion by the second connecting portion, the second connecting portion is connected to one end of the second portion and the other end of the end portion; when the second portion is connected to the first portion by the second connecting portion, the second connecting portion is connected to one end of the second portion and the other end of the first portion; the second connecting portion is arranged relatively in parallel with the first connecting portion or the second connecting portion is arranged perpendicular to the first connecting portion.

7. The fluid drive device according to claim 6, wherein the end portion is arranged between the first portion and the second portion along the extending direction of the thickness of the end portion; the end portion is arranged to be in contact with at least one of the first portion and the second portion along the extending direction of the thickness of the end portion, or a gap is provided between the end portion and at least one of the first portion and the second portion along the extending direction of the thickness of the end portion.

8. The fluid drive device according to claim 6, wherein the first portion is arranged between the end portion and the second portion along the extending direction of the thickness of the end portion; the first portion is arranged to be in contact with at least one of the end portion and the second portion along the extending direction of the thickness of the end portion, or a gap is provided between the first portion and at least one of the end portion and the second portion along the extending direction of the thickness of the end portion.

9. The fluid drive device according to claim 6, wherein the second portion is arranged between the end portion and the first portion along the extending direction of the thickness of the end portion; the second portion is arranged to be in contact with at least one of the end portion and the first portion along the extending direction of the thickness of the end portion, or a gap is provided between the second portion and at least one of the end portion and the first portion along the extending direction of the thickness of the end portion.

10. The fluid drive device according to claim 5, wherein the end portion is arranged between the first portion and the second portion along the extending direction of the thickness of the end portion; the end portion is arranged to be in contact with at least one of the first portion and the second portion along the extending direction of the thickness of the end portion, or a gap is provided between the end portion and at least one of the first portion and the second portion along the extending direction of the thickness of the end portion.

11. The fluid drive device according to claim 10, wherein the conductive member has a third hole, the third hole is arranged to penetrate the second portion along the thickness direction of the second portion, the third hole is in communication with the first hole, and one end of the pin extends into the third hole, the corresponding part of the pin extending into the third hole is defined as a third mating portion, and the third mating portion is limitedly connected to a side wall corresponding to the third hole.

12. The fluid drive device according to claim 11, wherein the fluid drive device further comprises a limiting member, wherein the conductive member is partially embedded in the limiting member, the limiting member is an injection-molded member;

the limiting member is fixedly connected to the stator assembly or is limitedly arranged relative to the stator assembly.

13. The fluid drive device according to claim 12, wherein the stator assembly and the limiting member are arranged along the height direction of the fluid drive device, and the stator assembly is arranged between the limiting member and an impeller assembly; or the limiting member is arranged between the stator assembly and the impeller assembly.

14. The fluid drive device according to claim 12, wherein the fluid drive device further comprises a housing, the housing comprises a first housing, and the fluid drive device further comprises a plug-in portion, wherein the plug-in portion is integrated with the first housing, and the plug-in portion comprises an accommodating chamber, and a part of the conductive member is arranged in the accommodating chamber.

15. The fluid drive device according to claim 14, wherein an opening of the plug-in portion is oriented along the axial direction of the fluid drive device, and the plug-in portion, the limiting member and the stator assembly are arranged along the axial direction of the fluid drive device.

16. The fluid drive device according to claim 5, wherein the first portion is arranged between the end portion and the second portion along the extending direction of the thickness of the end portion; the first portion is arranged to be in contact with at least one of the end portion and the second portion along the extending direction of the thickness of the end portion, or a gap is provided between the first portion and at least one of the end portion and the second portion along the extending direction of the thickness of the end portion.

17. The fluid drive device according to claim 16, wherein the conductive member has a third hole, the third hole is arranged to penetrate the second portion along the thickness direction of the second portion, the third hole is in communication with the first hole, and one end of the pin extends into the third hole, the corresponding part of the pin extending into the third hole is defined as a third mating portion, and the third mating portion is limitedly connected to the side wall corresponding to the third hole.

18. The fluid drive device according to claim 5, wherein the second portion is arranged between the end portion and the first portion along the extending direction of the thickness of the end portion; the second portion is arranged to be in contact with at least one of the end portion and the first portion along the extending direction of the thickness of the end portion, or a gap is provided between the second portion and at least one of the end portion and the first portion along the extending direction of the thickness of the end portion.

19. The fluid drive device according to claim 5, wherein the thickness of the second portion is less than or equal to 1.5mm, and the thickness of the second portion is the same as that of the end portion.

20. The fluid drive device according to claim 1, wherein the fluid drive device further comprises a ground member, one end of the ground member is in conductively contact with a stator core in the stator assembly, and another end of the ground member is configured as a ground pin end of an external power supply interface.

* * * * *